United States Patent [19]

Arzoian

[11] 4,135,700
[45] Jan. 23, 1979

[54] LAWN WEEDER

[76] Inventor: Samuel H. Arzoian, 942 Washington St., Portland, Me. 04101

[21] Appl. No.: 910,455

[22] Filed: May 30, 1978

[51] Int. Cl.² .............................................. B66F 3/00
[52] U.S. Cl. ................................................... 254/132
[58] Field of Search .............................. 254/132, 131.5

[56] References Cited

U.S. PATENT DOCUMENTS

| 1,142,783 | 6/1915 | Eagan | 254/131.5 |
| 2,716,538 | 8/1955 | Arrowood | 254/131.5 |
| 4,007,916 | 2/1977 | Maples | 254/132 |

FOREIGN PATENT DOCUMENTS

| 385558 | 12/1932 | United Kingdom | 254/132 |
| 1007273 | 10/1965 | United Kingdom | 254/131.5 |

Primary Examiner—Robert C. Watson
Attorney, Agent, or Firm—Laforest S. Saulsbury

[57] ABSTRACT

A lawn weeder in which the weed lifting prong is thrust downwardly by the foot at right angles from one end of the ground engaging the bottom lifting lever and thrust into the ground beside the weed by foot pressure upon the top of the prong end of the lifting arm and with a fulcrum structure over which the lifting lever is pivoted to effect lifting action of the prong and a curved handle extending upwardly from the rear end of the lifting lever to the waist of the user and a strut depending from the upper end of the handle to the bottom lifting lever to provide a complete quadrant-shaped operating handle. As the curved handle is grasped by the user at the waist height and passed across the front of the body, the weed will be easily lifted without effort and with the user not having to bend his back at any time. A ground-engaging fulcrum means is provided at the prong end of the lifting lever, which by foot pressure applied thereto, the prong is thrust into the ground beside the weed root. A ground-engaging foot plate carrying the fulcrum is hinged to the prong end of the lifting lever according to other forms of the invention to limit in movement whereby the foot can be easily kept upon the weeder during the lifting action and the weeder fulcrum provided upon the foot plate itself. If according to further forms, a curved handle and strut parts are so provided that the weeder can be collapsed for shipment and storage purposes. The weeder is shown made out of either tubing or a rod bent to the desired shape. The weeder can be made from a single rod length, the prong end swaged from the rod and a fulcrum made laterally coiling the rod adjacent to the prong and provided with further laterally extended fulcrum positions to provide for adequate ground contact.

13 Claims, 22 Drawing Figures

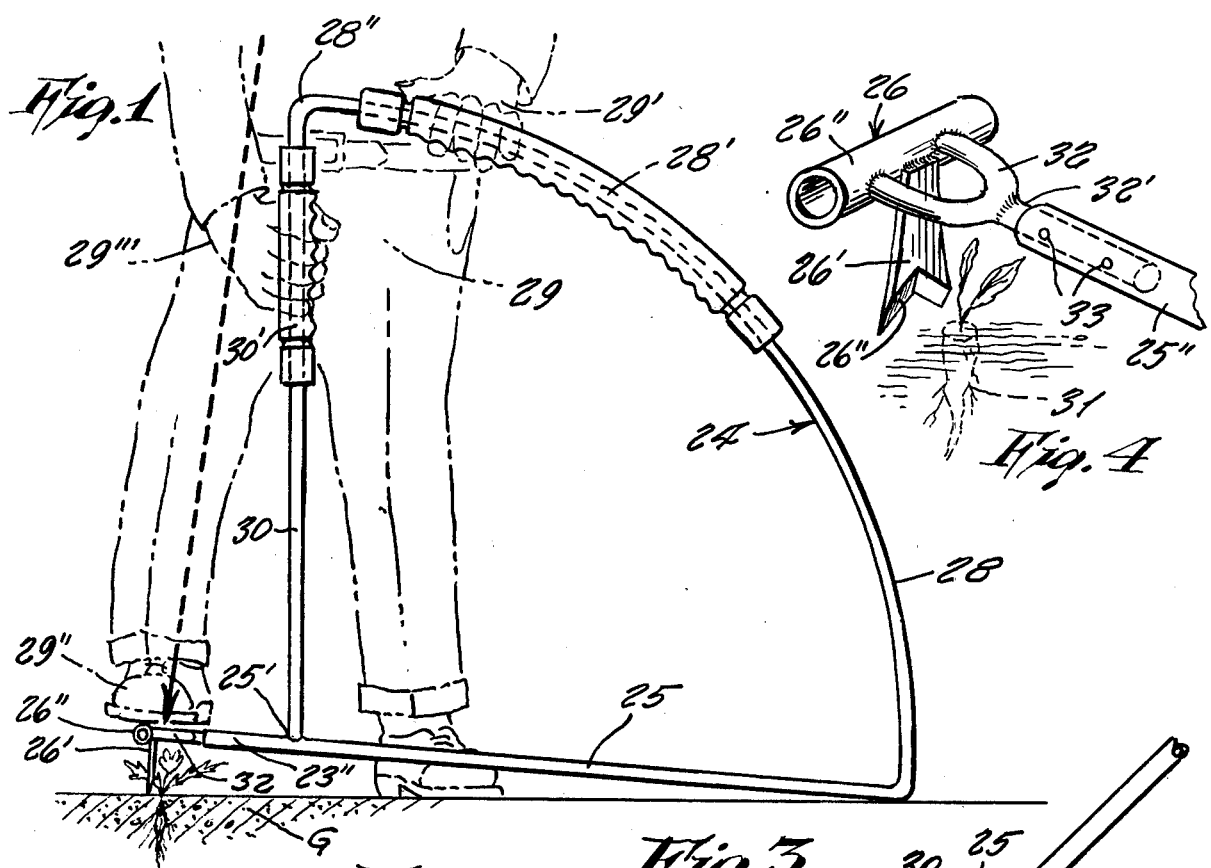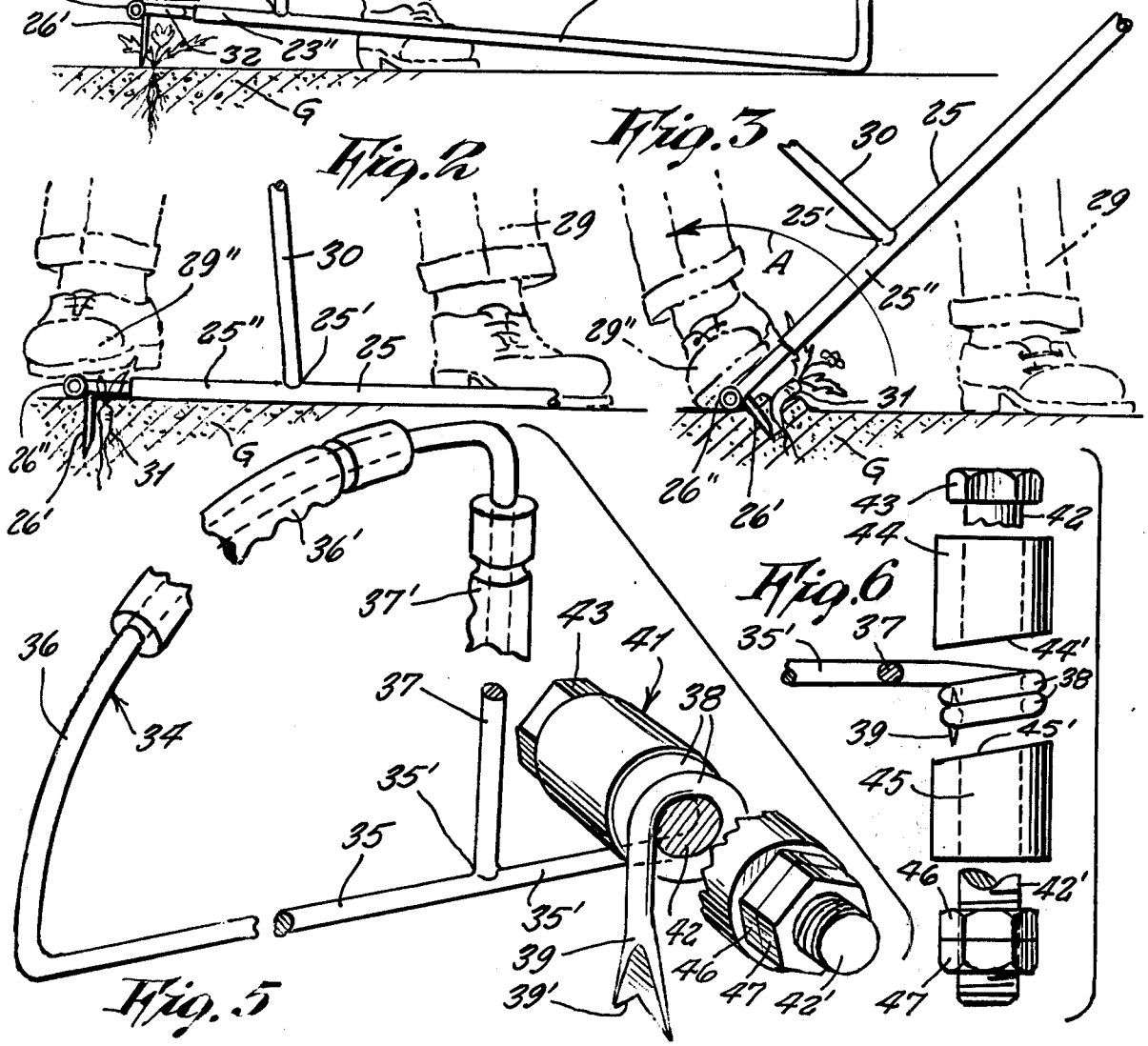

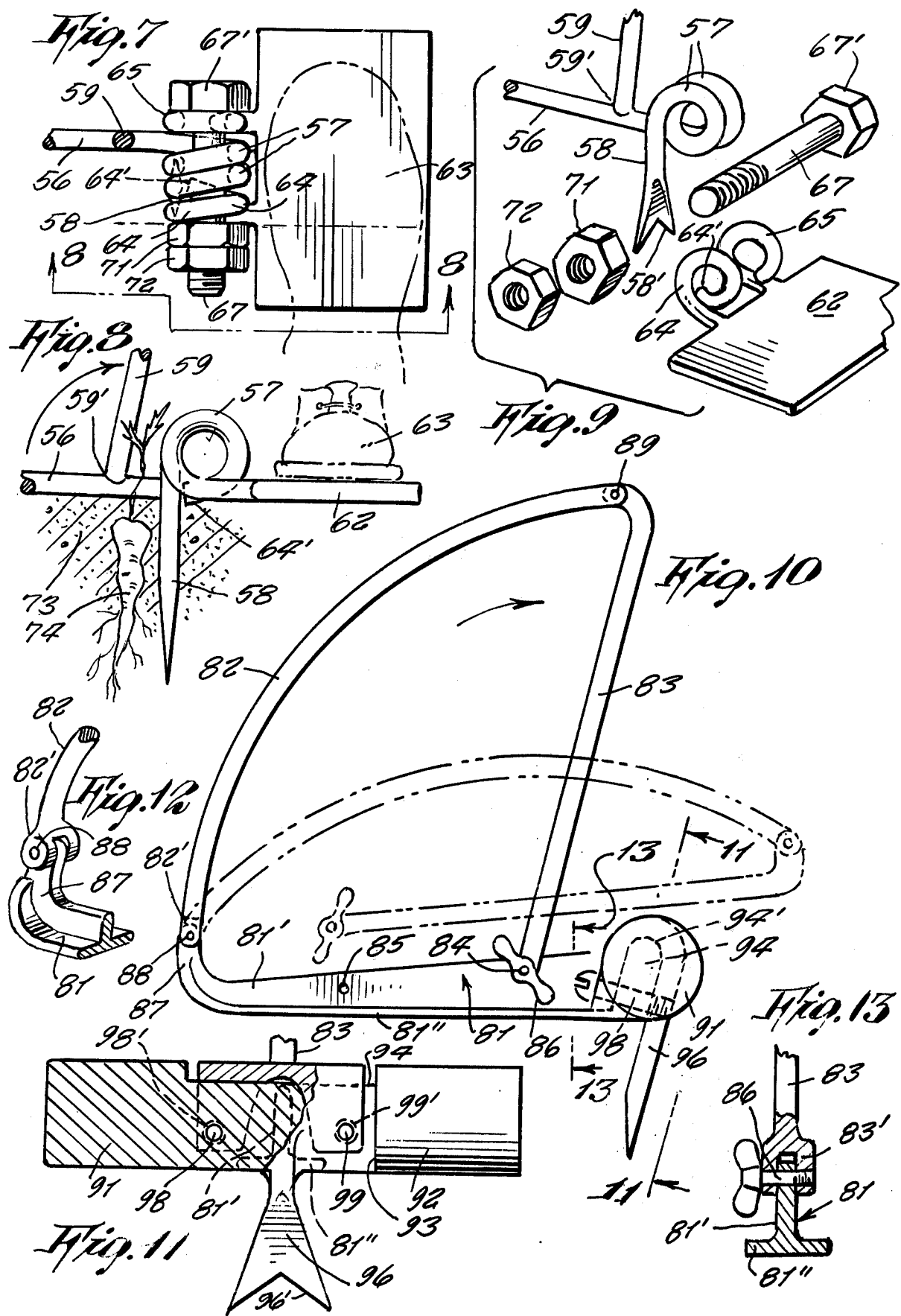

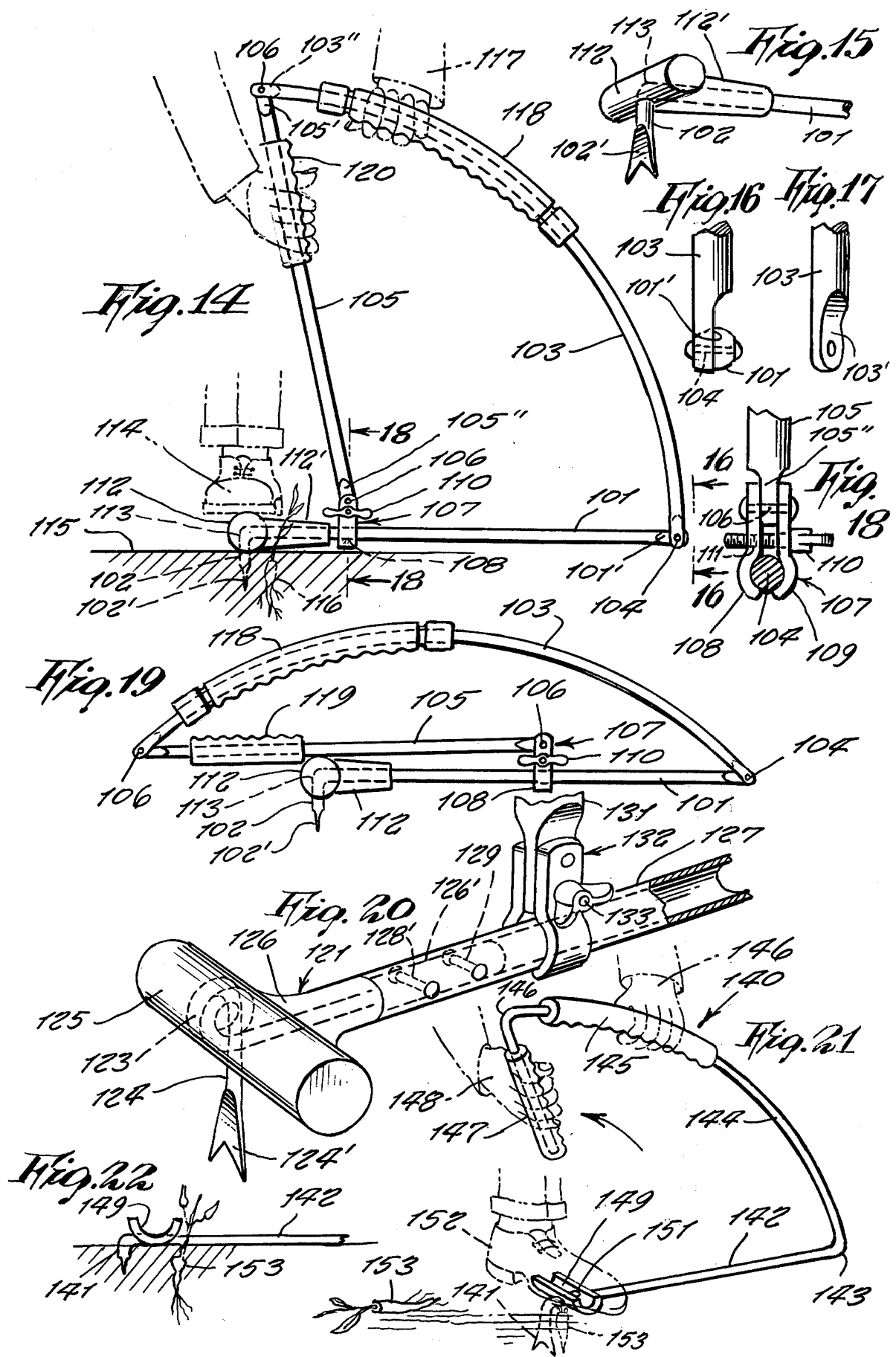

LAWN WEEDER

This invention relates to lawn weeders.

It is the principal object of the invention to provide a lawn weeder forked blade or prong that can be thrust into the ground beside the weed simply by the foot and while standing in a straight upright position, and while in this position without bending the back effect the leverage under the weed to lift it from the surface as by a simple lateral swinging of the elevated handle arm sideways across the front of the body, all being done without having to lower or bend the back and to minimize aggravation of backaches.

It is another object of the invention to provide such a lawn weeder that will be light in weight, easily handled by a woman or child and that can be simply made by bending lightweight stock tubing or rod and only the weed-engaging forked blade or prong be fashioned from a separate piece and attached to the bent tubing or rod but with the rod stock of the handle continuing into the forked blade or prong that will be swaged from the rod end itself and that extends from the elevated quadrant-shaped handle and elongated lever arm portions.

It is still another object of the invention to provide such a lawn weeder made from but a single rod with a prong swaged upon its end and the rod coiled adjacent to the prong to carry a ground-engaging fulcrum assembly that will be put into the engagement with the ground by applying the foot thereto and when the handle and lever arm portions that will be merely passed across the front of the body to effect the easy lifting of the weed from the ground.

It is still another object of the invention to provide such a lawn weeder that will be foot thrusted into the turf which has an upwardly swingable stamped out foot treadle or plate that limits the downward thrust of the weeder blade but provides the fulcrum and lies outwardly of the fulcrum so that the foot is not on the movable fulcrum as the handle is turned and can remain there to provide a stem fulcrum and allow the passage of the lever and elevated parts across the body keeping the foot thereon all the time to uproot the weed, but the foot plate being free to swing upwardly while limited in swing only to a horizontal ground-engaging position by engaging stop members one of the coiled blade ends and upon the foot plate formed of struck elongated curled projections on the inner side thereof.

It is a further object of the invention to provide a lawn weeder which has a lift lever arm and raised quadrant or arcuate handle positions that crosses the body during the lifting operation wherein the raised handle portion can be collapsed upon the lifting arm portion for the transport or storage of the weeder.

It is still a further object of the invention to provide a lawn weeder having a prong on a lever arm portion adapted to be foot-pressed into the ground and an upwardly-extended quadrant-shaped handle portion, in which the prong is detachable from the lever arm portion for the purpose of being sharpened or simply to be replaced when the original one has been worn out or broken.

It is still a further object of the invention to provide such a lawn weeder in which the fulcrum can be simply made by molding a mass about the coil of the rod from which extends this fulcrum taking the form of an elongated ground-engaging cylinder and wherein the lever arm can be attached to the prong by the full molding of a rear extension from the cylinder adapted to fit a tube end or about the rod arm.

Other objects of the invention are to provide a lawn weeder having the above objects in mind, which is of simple construction, easy to operate, has minimum number of parts, light in weight, easily assembled, of pleasing appearance, most efficient and effective in use.

For other objects and advantages of this lawn weeder over the other weeders in the field, reference may be had to the following detailed description, taken in connection with accompanying drawing, in which:

FIG. 1 is a front elevational view of the lawn weeder constructed according to the form of the invention actually reduce to practice wherein the upstanding handle and lever arm portions are made of one piece of tubing bent into the desired shape and with the prong-fulcrum assembly held by a rod projection extended into the open end of the tubing, illustration being made as to how the prong is thrust into the ground sod by the foot pressing upon the fulcrum.

FIG. 2 is a fragmentary front elevational view of this lawn weeder after the weeder prong depending from the fulcrum foot applying end of the horizontal tubular lever arm portion has been thrust by the foot into the ground beside the weed root in preparation for lifting the weed out of the ground, thereby illustrating the first step for the operation of the weeder.

FIG. 3 is a fragmentary front elevational view of the lawn weeder, showing the same fragment as in FIG. 2 but with the operator's foot being tilted with fulcrum as the weeder is angled about its fulcrum and the bottom lever arm portion having been elevated by the handle portion and finally to a point where the weed will have been extracted.

FIG. 4 is an enlarged fragmentary perspective view of the prong-fulcrum foot pressure fixture secured to the end of the horizontal tubular lever arm portion of the lawn weeder.

FIG. 5 is a fragmentary perspective view of a modified lawn weeder wherein the tubing used in the first form of the invention is replaced by a continuous rod bent to provide the raised arcuate or quadrant-shaped handle and ground lever arm portions is coiled to provide support to a separable fulcrum nut and bolt assembly and a turned down end of coil is split and swaged to provide the weed lifting prong, the coil wound to tighten as the lifting section is effected and the end of the rod split and swaged into a blade.

FIG. 6 is a fragmentary exploded and collective and top plan view of the coil and fulcrum assembly of FIG. 5 with the retaining bolt being broken away and the spacer sleeves being set apart from the pronged rod coil.

FIG. 7 is a fragmentary plan view of the lower end of the lawn weeder made from a rod with fulcrum coil and of the form as shown in FIGS. 5 and 6 but with a foot tread or thrust plate to which the rod coil is pivotally connected by a bolt and lock nut assembly and to provide the fulcrum upon which the lever arm and quadrant handle portion are pivoted so that the foot can still be kept upon the plate to retain the fulcrum against movement over the ground as the weed is lifted, the fulcrum center being kept fixed and not dependent upon the ground that may be too soft for good fulcrum purposes.

FIG. 8 is a fragmentary side elevational view as viewed generally on line 8—8 of FIG. 7 with the prong penetrating the ground and stop lugs formed by the coiled plate lugs engage one another to fixedly align the foot plate at 90° with respect to the prong preparatory to the thrust of the prong into the ground by the foot.

FIG. 9 is a fragmentary perspective and exploded view of the coil and prong formed from the bent rod, lever and handle portions, fulcrum bolt and nuts and the stamped out foot plate with the curled up limiting top projections.

FIG. 10 is a side elevational view of a still another modified form of the lawn weeder that will be collapsible for shipping and storage purposes and has a replaceable blade or prong fitted into elongated plastic fulcrum cylinder and the weeder illustrated with dot and dash lines when in its collapsed state.

FIG. 11 is a fragmentary and sectional view of the front portion of the lawn weeder as viewed generally on line 11—11 of FIG. 10 and looking in elevation upon the depending split and swaged prong and the elongated cylinder ground fulcrum support.

FIG. 12 is a fragmentary perspective view of the lawn weeder of FIG. 11 taken of the pivotal connection between one of the collapsible handle parts with the outer end of the bottom prong lever arm part.

FIG. 13 is a fragmentary vertical sectional view of the lawn weeder of FIG. 10 as viewed upon line 13—13 thereof and hand part that is detachably connected to the prong lever arm part.

FIG. 14 is an elevational view of a still another modified form of the invention, wherein the handle parts are collapsible over the lever part by the different lock means and wherein the coiled fulcrum portions of FIGS. 5 to 9 are dispensed with, and the prong is simply a bent down end of the rod lever arm part and the fulcrum is simply a cylindrically shaped plastic piece molded thereof that has a portion running rearwardly along the lever arm to allow for more spread of the foot.

FIG. 15 is a fragmentary perspective view of the molded fulcrum plastic piece upon the turned down prong end of the collapsible weeder of FIG. 14.

FIG. 16 is a fragmentary and elevational view of the hinged joint between outer end of the pronged lever arm and the upwardly-extending curved handle part as viewed along line 16—16 of FIG. 14.

FIG. 17 is a fragmentary perspective view of the fragmental handle part shown in FIG. 16.

FIG. 18 is an enlarged sectional and fragmentary elevational view of the weeder of FIG. 14 as viewed of line 18—18 thereof, and shown in particular the clamp used when the weeder handle parts are elevated and which when released is slidable along the lever arm part to collapse this lawn weeder.

FIG. 19 is an elevational view of the lawn weeder of FIG. 14 in its collapsed state for shipping and storage purposes.

FIG. 20 is an enlarged perspective view of a prong and plastic fulcrum assembly for a collapsible lawn weeder with a slide clamp but the parts made of tubing rather than of rod material and the prong part including the coil and plastic fulcrum with its rear running portion adapted to be inserted into an open tubing end and secured therein by rivets.

FIG. 21 is a perspective view of a further modified form of the lawn weeder, made from a single bent rod, with a bent down prong and a half-cylinder cross foot piece extended thereover.

FIG. 22 is a fragmentary side elevational view of the lawn weeder according as to still a further form of this invention.

Referring now to FIGS. 1 to 4, there is shown the lawn weeder 24, a model of which has been reduced to actual practice by the applicant and found to work with great satisfaction to remove weeds from his lawn. This lawn weeder was made from a single tube of lightweight metal tubing to provide a bottom horizontal lever arm portion 25 in the front open end of which there is secured a ground foot-engaging fulcrum and depending prong device indicated generally at 26 and shown in detail in FIG. 4. Bent upwardly and forwardly from the outer end of the horizontal lever arm portion 25 is a curved arcuate handle portion 28 that rises to the hip of an operator 29 and has an elongated plastic hand grip 28' molded on its upper end where it can be easily gripped by the operator's left hand 29' for the swinging of the weeder to the right laterally across the front of his body without having to stoop and with minimum effort and while keeping his right foot 29" upon the prong device 26. The upper end of the curved handle 28 is bent at 28" downward to provide a vertical strut 30 with a depending handle 30' molded thereon that the operator 29 grips with his right hand 29" that connects with the forward end of the lever arm portion 25 at 25' in a rigid manner leaving a projection 25" for the insertion of the fulcrum-prong device 26 to which the operator's right foot 29" to first force the prong 26' of the device 26 into the ground G up to its transverse tubular fulcrum sleeve portion 26" and beside a well-rooted weed 31, FIG. 2, and second the foot 29" rolls with the weeder and keeps the fulcrum down as best illustrated in FIG. 3. The fulcrum sleeve 26" thus limits the downward thrust of the prong 26' into the ground with foot 29". Welded to and extending rearwardly from the lateral sleeve fulcrum portion 26" at right angles to the prong is a yoke portion 32 having a rigid central length 32' that extends into the end of the tubular portion 25" and held therein against rotation by any suitable rivets 33, FIG. 4.

The prong 26 is split and swaged to provide a sharp blade edge 26''' and when placed in the ground beside the root of the weed 31 and with the foot 29" still on the device and the weeder is passed laterally by quadrant-shaped handle across the body of the operator by his left and right hands in the direction of the arrow A of FIGS. 1 and 3, the split blade end 26''' will gather up the lower end of the weed root and being the weed 31 up and out of the ground and free thereof being illustrated in FIG. 3 and the forward end of the weeder will have been rolled onto its fulcrum tube 26" that is kept in engagement with the ground by the foot 29" of the fulcrum sleeve 26" but turned away with the weeder. This operation is repeated all over a weed filled lawn until such well-rooted weeds will have been removed, all without digging, stooping or bending the back and with much pleasure and satisfaction and freedom from backaches.

The other forms of the weeder are to be now described while different therefrom somewhat in detail construction will be operated generally in the same manner all with its quadrant-shaped handle and by passing merely one's arm across the body. Even the female sex finds the weeder easy to operate and a pleasure to use as the leverage is so greatly increased by virtue of the short prong 26" being at right angles and operates relatively to the long lever arm length portion 25. The lever arm end 17 has, in effect, by the curved handle portion 28 been conveniently placed at bend 22 at the upper end of vertical strut 25. The hand grip 21 upon the curved handle portion 18 and hand grip 26 on strut 25 can be retained for complete passage of the weeder over the front of the body to lift the weed 31 from the ground turf G.

In FIGS. 5 and 6, the prong, lift lever arm and curved handle portions and vertical strut are made from but a single piece of standard metal rod stock free of tubing and bent to conform generally to the same shape as above described, a weeder 34 constructed so that the rod is rolled upon itself to provide the fulcrum and the prong split and swaged from the rod end adjacent thereto. A single rod is bent to provide a horizontal or bottom lever arm portion 35 upwardly and forwardly from which extends an arcuate handle portion 36 and from the upper end thereof a strut portion 37 extends downwardly and rigidly connects with lever arm portion 35 at 35'. The rod lever arm portion 35 is forwardly extended at 35' from the strut 37 and rolled into two coils 38 ending with a prong 39 extending downward at right angles to the lever arm portion 35 and in which the rod end has been split and swaged into a recessed prong blade 39 with sharp edge 39'.

The entire lawn weeder of FIGS. 5 and 6, including coils 38 and prong 39 is thus made of one single piece of rod and may be found operable alone without a full fulcrum assembly presently to be described and dependency made only upon the coils contacting the ground over which the weeder would be pivoted to lift the weed with the pre-sunk prong 39 from the ground turf.

To provide for a more satisfactorily operable weeder, a fulcrum assembly 41 is fitted into the coils 38 and will provide more fulcrum structure to which the foot will be applied in sinking the depending blade 39 into the ground beside the weed root. Use is thus made of the two spiral coils 38 for supporting a fulcrum assembly 41. This fulcrum assembly 41 includes a threaded bolt shank 42 having a head 43 and that extends through the coils 38. Assembled upon the bolt shank 42, respectively at opposite sides of coils 38 are respective sleeve spacers 44 and 45 respectively having opposingly inclined faces 44' and 45' to respectively accommodate the respective inclined faces of the spiral rod coils 38. When these parts of the fulcrum assembly 41 have been assembled upon the rod coils 38 with the bolt shank 42 extended therethrough, and the parts drawn up tight by a nut 46 that will be held in place by an outer lock nut 47, both nuts being threaded upon the threaded end 42' of the bolt shank 42. The rod coils 38 are wound about the bolt shank 42 in a direction that with the prong 39 sunk in the ground beside the weed root, the lifting of the lever rod portion 35 will tend to work the coils 38 about the bolt shank 42 to tighten then about the bolt and to stiffen the fulcrum assemblage 41 in its connection with the coils 38 and give the prong 39 such rigidity and insure its early engagement with the side of the weed and perhaps enough springiness when released to flip the weed out of the ground thereby with less turning of the weeder being necessary of the handle as it is passed across the front of the user's body. The lifting will be effected in a clockwise direction as viewed in FIG. 5. The prong 39 is thrust into the ground by applying the downward foot pressure to the fulcrum assembly 41 and coils 38 and while keeping the foot upon the fulcrum and hands on the grips 36' and 37' passing at the quadrant handle across the front of the body in the same manner as illustrated and described with the first form of the invention of FIGS. 1 and 3.

In FIGS. 7, 8 and 9, there is shown a still further form of the invention. This invention has the solid rod frame just described and as shown in the form of the invention of FIGS. 5 and 6 in which the rod will have been bent the same and having its horizontal lever arm portion 56 provided with coils 57 with a depending prong 58 and a swaged split rod recessed blade formation 58 on its lower end and a connected upstanding vertical strut rod portion 59 secured at its lower end at 59' to the horizontal lever arm portion 56. In essence, this rod is bent to conform to the frame of FIGS. 1 and 5 and with coils 57 and depending prong 58 you have in effect a full weeder with the coils serving as the ground-engaging fulcrum.

The coils 57 by themselves are not so easy upon the foot and to provide a more substantial fulcrum means for the weeder, a foot stamped out plate 62 is used and the foot can be kept straight upon the plate for the full procedure, with the fulcrum being upon the plate instead of in direct engagement with the ground. When the lawn weeder is to be used on soft ground, the fulcrum will be prevented from sinking into the soft ground during the lifting action, since the fulcrum is put upon the foot plate 62 which has relatively greater ground contact area than the coils 57 themselves. The weeder is thus ideal for soft ground weeding. The foot plate 62 is large and can take the full sole of foot shoe 63, FIGS. 7 and 9.

At the rear edge of the foot plate 62 are two rearwardly extending curled up long lugs 64 and 65 with lug 64 laterally offset to provide stop end as seen at 64 to engage prong 58 depending from coils 57 and to limit the pivoting down of plate 62 to a right angle with the prong 58 and extend laterally therefrom. The foot plate 62 is assembled upon the rod coils 57 by a bolt shank 67 and with head 67' and passed through the rod coils 57 and curled plate lugs 64 and 65 and secured against axial displacement by nut 71 and locknut 72. Lug stop 64' on the foot plate engaging the prong 58 by the application of the foot shoe 63 upon the foot plate 63 to sink the rod prong 58 and split blade end 58' into ground turf 73 beside a weed root 74, FIG. 8, so that the lever arm portion 56 and the foot plate will lie coextensively with one another upon the ground turf 73. The right foot will be kept in place upon the foot plate 62 while the rod lever arm and handle portions are passed across the body about pivot bolt shank 67 so that the coils 57 and prong 58 will lift the weed root 74 out of ground turf 73 while the foot plate is continued to be held flat upon the ground to provide a fixed fulcrum pivot allowing the leg and foot to remain straight and not turned off the fulcrum as illustrated in FIG. 3. One can get from one weed to another to lift well lodged weeds from the entire lawn whether dry or soggy. It should be understood that the lever and handle portion like those in FIGS. 5 and 6 extend upwardly to the operator's waist and easily accessible for use.

A form of the invention shown in FIGS. 10 to 13, has the curved handle and strut parts collapsible upon the lever portion and when extended has generally the same shape as the other weeder forms and will be operated in the same manner. A bottom lever part 81 is molded into a T-section shape to which a curved handle and upright strut parts 82 and 83 and all parts are hingedly connected together in chain fashion. The strut part 83 however is, in turn, releasably connected to the bottom lever arm part 81 at two hole locations 84 and 85 thereon, as by a winged-headed thread bolt 86 carried upon the lower end of the strut part 83 and adapted to pass through either hole 84 or 85 to lock a bifuracated or yoke formation 83' on the strut part 83 to central rib 81' of the bottom T-section of lever part 81, FIG. 13, with its flat bottom 81" lying flat upon the ground turf when the weeder is put into use. When the winged-headed bolt 86 is extended through hole 84 and strut part 83 is elevated as shown in full in FIG. 10 and the whole assemblage is made rigid for use. When the bolt 86 of strut 83 is released from forward hole 84, the curved handle and strut parts 82 and 83 can assume the collapsed position as shown in dot and dash lines in FIG. 10 with the bolt 86 either left free as shown, or placed in hole 85 to make the collapsed parts rigid. The T-section bottom lever arm part 81 is turned up at its rear end as best seen in FIG. 12 at 87 and the curved handle part 82 provided with a bifurcated or yoke shape end 82' that is hingedly connected by a hinge pin 88 to roll up end 87 of the bottom lever arm part 81. The upper ends of the curved handle and strut parts are hingedly connected together in any suitable manner and by hinge pin 89.

The rib 81' of bottom lever part 81 increases in height from the rear, forwardly and on its forward end beyond the strut part 83, there is formed a centrally-recessed wide cylindrically shaped ground-engaging fulcrum portion with axially-aligned cylindrical end formations 91 and 92 that extend laterally from the forward end of the bottom arm part 81. The central recess is indicated at 93, FIG. 11, provides for rectangular section spacer lateral portion 94 lying intermediate and cylindrical formations 91 and 92 and rounded on its top edge as at 94', FIG. 10.

A spread prong 96 has a hook formation 96' that is releasably attached to the lateral portion 94 and depends downwardly to extend substantially at right angles to the flat horizontal portion 81" of the bottom lever arm part, FIGS. 10 and 11. This prong hook formation 96' is of U-shaped section that easily fits down over the rounded top edge 94' of the intermediate portion 94 and is releasably held thereover by two spaced fastening screws 98 and 99 accessible from the rear of the fulcrum portion and extending through aligned holes in the U-shaped prong hook formation and the intermediate portion 94 with thread connections being made with the forward bolt holes 98' and 99'. The long leg of prong 96 is split away to provide sinking edge 96'. This form of lawn weeder is used in the same manner as the other forms with the foot being applied to the cylindrical fulcrum formations to sink the lifting prong beside the weed and from the top of the assemblage without stooping to effect the pivoting of the weeder across the front of the body to lift the weed from the ground turf and with the foot swung with the fulcrum as illustrated in FIG. 3.

In FIGS. 14 to 19, there is shown another collapsible lawn weeder made entirely of rod stock and perhaps less simple and expensive in construction that the collapsible form of the invention just recently described in connection with FIGS. 10 to 13. This form of lawn weeder comprises generally a horizontal rod lever arm 101 from the free end of which a prong 102 is bent down and swaged into a split spread sharpened edge 102', an upwardly and forwardly curved rod handle 103 hingedly connected by a pivot pin 104 to the rear end of lever arm 101 as best seen in FIG. 16, the connecting ends of the arm and curved handle being cutaway or flattened as best shown in FIGS. 14, 16 and 17 at 101' and 103' and with holes to accommodate the double kneaded pivot pin 104, a downwardly-extending strut part 105 pivotally connected by a pivot pin 106 to the forward cutaway 103" of the curved handle 103 by its cutaway end 105' in the manner just described for the lever arm 101, curved handle 103, pin 105 and shown in FIGS. 16 and 17 and the lower end of strut rod 105 centrally flattened at 105" that is connected to a clamp device 107 that connects the strut 105 with the rod lever arm 101 and by releasing this clamp device 107 the strut and handle rods 105 and 103 can be collapsed up upon the lever arm 105 to assume their position shown in the collapsed weeder of FIG. 19 to consume less space for shipping or storage.

The clamp device 107 has opposing clamp plates 108 and 109 that respectively grasp the respective opposite sides of lever arm rod 101, pivoted by pin 106 to the strut 105 and clamped or released by a winged-headed clamp screw 110 that is threaded in the threaded opening 111 of clamp plate 108, FIG. 18. In FIG. 14, the lower end of the strut 105 is shown clamped forward on the lever arm 101 and the entire lawn weeder ready for that has been described with regard to the other forms of the invention. When the winged-headed clamp screw 110 is released the clamp device can be moved rearwardly to position shown in FIG. 19 and the part collapsed in the manner shown therein.

The prong 102 is simply bent down from the lifting arm lever 101 and without fulcrum coils as have been provided with other forms of the invention. In order to provide a ground fulcrum and foot pressure applying means, a laterally-extending cylindrical plastic formation 112 is molded about bend 113 on the lever arm part and upper end of prong 102 along with a rearwardly-extending portion 112' of the plastic about the rod arm 101, FIGS. 14, 15. The foot 114 will be applied to the plastic cylinder 112 and its portion 112' to sink the prong 102 into ground 115 beside weed root 116 and kept thereupon while a left hand 117 grasps an elongated plastic grip 118 molded onto the waist high upper end of curved handle rod 107 and a right hand 119 grasps a shorten plastic grip 120 molded upon the upper waist high end of the strut 105. While keeping foot 114 in place on the fulcrum 112 and passing the hands across the operator's body and pivoting the lawn weeder in a counterclockwise direction as viewed in FIG. 14, the weed and its root 116 will be easily lifted from the ground turf 115 without need of the operator bending his back, all in a manner as has been explained above.

In FIG. 20, there has been shown a special prong and fulcrum device 121 adapt for use with weeders made from tubing. Assume the weeder has been made from tubing as in the case of the first form of the invention as shown in FIGS. 1 to 4, the prong-fulcrum device 26 can be substituted for this device 121, a rod 122 is coiled to provide a plastic fulcrum support 123 and a terminating in a depending prong 124 with a spread blade 124'. Molded about the rod coil support 123 is a plastic fulcrum 125 that extends laterally from the opposite sides thereof to rest upon the ground when the prong 124 has been sunk thereinto in the manner set forth above and running from the plastic fulcrum portion 125 and integral therewith over the shank of the rod 122, is a plastic extension 126 with a further extended reduced diameter portion 126' adapted to be tight fitted into the end of a tubular lever lift arm portion 127 of a weeder made from tubing. The reduced diameter portion 126' is extended in the end of tubular 127 up to a shoulder 126" and with the rod shank 122 and plastic extension 126' drilled with hole to accommodate spaced double headed rivets 128 and 129, the prong-fulcrum device 121 will be positively held against axial displacement from the tubing arm 127. A strut 131 and its clamp device 132 can be held in its adjusted position along the tube lever by winged-headed clamp bolt as defined above in connection with FIGS. 14 and 18, so that there will have been provided a collapsible weeder similar to FIGS. 14 and 19 but substantially made of tubing instead of completely of rod.

In FIGS. 21 and 22, there is shown perhaps the simpliest form of the invention, a lawn weeder 140 without a strut portion as with the other forms of the invention but still made of a single rod piece with a bent down prong 141 of the same rod piece. Extending laterally at right angles from the prong 141 is a left lever arm portion 142 and bent upwardly from rear end of the arm at 143 is an upwardly and forwardly-extending arcuate curved handle portion 144 with an elongated plastic hand grip 145 accessible to the operator's left hand 146 at a location waist high upon the operator. The upper end of the handle portion 144 is bent down at 146 and terminating with plastic molded grip 147 that is grasped by the left hand 148 waist high on the operator. A split cylindrical piece 149 is started at 151 intermediate its length and fitted down over the lever arm rod 142 to provide with its round bottom surface a fulcrum and foot pressure applying member 149 to which right foot 152 is applied to force the prong 141 in the ground beside a weed root 153 and while the foot is still upon the member 149 the hand grips 146 are passed laterally across the operator's waist without the operator having to bend his or her back in a counterclockwise direction as viewed in FIG. 21 to lift the weed 153 from the ground all in the manner that has been described hereinabove.

It should now be apparent that there has been now provided a lawn weeder that can be used while in the standing position with little effort by simply passing the raised handle across the front of the body and without having to lower or bend the back.

It will also be apparent that the present lawn weeder can be fashioned from a single stock rod piece with foot-applying and fulcrum formation simply provided by rod coils that can serve to support as the ground fulcrum and the foot plate by which the foot can still be kept on the weeder as when the weeder is turned to lift the weed from the ground turf. It should also be seen that a collapsible lawn weeder has been provided for shipping and storage purpose but which can be readily made adapted for use.

While various changes may be made in the detail construction of this lawn weeder assemblage, it shall be understood that such changes shall be made within the spirit and scope of the invention as defined by the appended claims.

What is claimed is:

1. A lawn weeder comprising an elongated bottom lever arm portion, a weed lifting prong secured to one end of the lever portion and extending downwardly therefrom to penetrate the ground beneath a weed root upon the application of foot pressure of the user upon the lever arm above the prong, a curved handle portion extending upwardly and forwardly from the opposite end of the lever arm portion to a height near to the waist of the user and within easy reach of his hands and a vertically-extending strut portion depending from the upper end of the curved handle portion and aligned with the one end of the lever portion rearwardly of the prong a sufficient distance to allow for easy application of the foot to the forward side of the strut portion, the action for the lifting of the weed being effected when the curved handle portion is grasped and passed laterally across the body of the user adjacent his waist and without bending his back, all said portions including the prong being substantially the same vertical plane and generally shaped as a quadrant.

2. A lawn weeder as defined in claim 1 and said strut portion being secured to the lever portion, and all of the bottom lever, curved handle and vertical strut portions being of a single elongated piece, tube or rod, and bent upon one another and joined upon itself in the connection of the lower end of the strut portion to the forward end of the bottom lever arm portions.

3. A lawn weeder as defined in claim 2 and a hand grip extending about the upper end of the upwardly-extending curved handle portion and a hand grip extending about the upper end of the strut portion to provide a non-sliding grips of the hands with handle portion.

4. A lawn weeder as defined in claim 2 and a ground-engaging fulcrum means extending laterally across the upper end of the prong beyond the opposite sides thereof and engageable with the ground surface to limit the extent of sinking the prong into the ground with the foot and to provide a fulcrum upon which the weeder is turned as the handle portions are passed across the front of the body by the user.

5. A lawn weeder as defined in claim 1 and said bottom lever arm portion being in the form of a tube, a replaceable prong and fulcrum device including a transversely-extending fulcrum bar and a rearwardly-extending portion tightly fitted into the lever arm portion said rearwardly-extending portion including a spread yoke section for accommodating the expanse of the foot and a shank extending from the yoke and tightly fitting the tube, replaceable means secured between the shank and the tube for further fixing the device on the tube against axial and rotational displacement therefrom, and a weed engageable prong extending down from the fulcrum bar at right angles to the foot spread yoke, whereby the prong and fulcrum device may be removable from the weeder for the purpose of the prong being sharpened as replaced by a prong of different length.

6. A lawn weeder as defined in claim 4 and all of said portions being formed of a single solid rod stock piece bent as set forth herein above and having its bottom lever portion forwardly of the strut portion coiled to provide transversely-aligned coils to serve as a fulcrum for the weeder and the said weed-engaging prong depending therefrom whereby said coils provide the fulcrum means and the spread area for receiving the pressure foot, pressure to sink the prong and to hold the weeder in ground engagement on its fulcrum while the weeder is turned to lift the weed from the ground turf.

7. A lawn weeder is defined in claim 6 and further ground fulcrum means comprising a headed bolt extending axially through the coils, spacer sleeves on the bolt disposed respectively at the opposite sides of the coils of larger diameter than the coils to enlarge the foot spread area and lock nuts upon the bolt to prevent the release of the fulcrum assemblage from the coils.

8. A lawn weeder as defined in claim 6 and a foot plate adapted substantially receive the full bottom area of a shoe curled up lug hinge projections extending from one side of the plate, said rod coils axially through the plate projections, hinge pin means extending axially through the plate projections and coils to allow the rod weeder to be fulcrumed upon the foot plate to lift the weed while keeping the foot plate pressed against the ground with the foot, and stop means operable between the coil and at least on the foot plate projections and engageable with the depending prong to limit downward pivotal movement of the foot plate upon the rod weeder.

9. A lawn weeder as defined in claim 1 and said bottom lever, curved handle and strut portions being separably formed parts, the curved handle part being pivotally connected to the bottom lever arm part and the strut part being pivotally connected to the upper end of the curved handle part and means for detachably connecting the lower end of the strut part to the bottom lever arm part forwardly of the pivot connection to the curved handle part to the bottom lever part, whereby upon release of the lower end of the strut part from the bottom lever arm part and the carrying of the lower detached end of the strut part rearwardly the curved handle and strut parts can be collapsed upon the lever part for purpose of shipping and storage.

10. A lawn weeder as defined in claim 9 and said prong being replaceably connected to the lever arm part, a fulcrum formation extending transversely across the forward end of the lever part over the prong, said fulcrum formation having an intermediate recess for receiving the lifting prong part, and means for releasably securing the prong part to the end of the lever part within the fulcrum recess thereof.

11. A lawn weeder as defined in claim 1 and said weeder being formed of solid rod, the forward end of the bottom lever arm portion having a prong formation bent down at an angle to arm the portion and a laterally-extending cylindrically shaped fulcrum molded of plastic about the bend between the prong and the lever arm portion and a portion of the molded plastic extending rearwardly along the lever arm portion.

12. A lawn weeder as defined in claim 1 and said weeder being formed of tubing, the prong being formed of separable solid rod and including coil of the rod from which the prong depends and an attaching extension extending rearwardly from the coils, and a plastic cylindrical fulcrum molded about the coils and the rod attaching extension and tight-fitted with the extension into the open end of the tubing bottom lever arm portion.

13. A lawn weeder as defined in claim 1 and the forward end of the lever arm portion having a prong formation bent down from the lever arm portion providing a bend thereat, and a fulcrum secured over the prong bend being in the form of a half hollow cylinder with separate upper edges for application of the foot to sink the prong.

* * * * *